Patented Nov. 2, 1943

2,333,608

UNITED STATES PATENT OFFICE 2,333,608

GLASS SOLUTION

Robert N. Wenzel, Swissvale, Pa., assignor to Westinghouse Electric & Manufacturing Company, East Pittsburgh, Pa., a corporation of Pennsylvania No Drawing. Application March 16, 1940,
Serial No. 324,449

9 Claims. (Cl. 106—49)

This invention relates to glass, and more particularly to a solution of a glass.

This application is related to application, Serial No. 324,450, Robert N. Wenzel, Glass solutions and glass coatings, filed March 16, 1940, now Patent No. 2,308,409.

Heretofore, most glasses have been generally dissolved only by reagents which chemically reacted therewith and which fundamentally destroyed the glass. When the solvent or reagent was removed the original glass was not deposited. The water soluble glasses known as water glass, whose components are silica and alkali metal oxides, are substantially all of the very few materials having glass forming components that may be put into solution without a fundamental chemical destruction of the substance itself. The composition of water glass and its hygroscopicity are limitations to its use for many purposes.

The objects of this invention is to provide for putting a glass into solution.

The other objects of the invention will, in part, appear hereinafter.

The invention, accordingly, comprises a composition of matter possessing the characteristics, properties and relation of constituents which will be exemplified in the composition hereinafter described and the scope of the application of which will be indicated in the claims.

The lead borate glasses have attained considerable importance as dielectric and insulating materials. Furthermore, they melt at the lowest temperatures of all the glass forming substances. Practically all other glasses known melt at higher temperatures. Even with this low temperature melting characteristic, lead borate glasses have a limited field of application, due to temperature and viscosity characteristics.

It has been discovered that lead borate may be dissolved in polyhydroxy alcohols. The lead borate, fused and pulverized, will dissolve in polyhydroxy alcohol or the basic ingredients lead oxide (PbO) and boric oxide ($B_2O_3$) may be introduced as a mechanical mixture in powder form and will dissolve in this class of solvents. A source of lead oxide is minimum ($Pb_3O_4$) or litharge (PbO). Boric oxide may be supplied as boric acid ($H_3BO_3$) or its anhydride ($B_2O_3$).

Almost any proportion of lead oxide to boric oxide may be put into solution. It is generally preferable, from the standpoint of stability, that the proportion of boric oxide be less than 40% since the lead borate glasses having over 40% of boric acid are attacked by and are readily soluble in water. For many purposes, especially for use in electrical industries, this feature is disadvantageous. In applications not susceptible to moisture, this feature may not be material, and any predetermined range of lead oxide to boric oxide may be employed in solution.

In addition, certain third ingredients may be put into solution along with the lead borate. Thus, a three-component glass may be present in a solvent.

The solutions formed may range in viscosity from a free running liquid to an extremely viscous syrup. The viscosity, at the same temperature, for a given solvent varies as the amount of solute in solution.

The solvents which have been found particularly useful in dissolving lead borates are ethylene glycol, diethylene glycol and glycerine. These solvents will dissolve more lead borate and be less viscous for a given concentration than other polyhydroxy solvents. However, all other glycols and polyhydroxy alcohols which are liquids may be employed as solvents for lead borate. Mixtures of the solvents may be used, as well as individual solvents.

The solution using ethylene glycol as a solvent is particularly satisfactory because up to 55% or more of lead borate is soluble in the material. At this concentration the liquid is clear but extremely viscous. Furthermore, a 45% solution in ethylene glycol is not more viscous than 30% of lead borate dissolved in diethylene glycol or glycerine. For applications necessitating a considerable amount of lead borate, the ethylene glycol will carry more solute for a given viscosity than the other polyhydric alcohols.

In order to effect the solution of lead borate in a polyhydroxy alcohol, such as ethylene glycol, lead oxide and boric oxide finely pulverized, preferably 100 mesh or finer, are introduced simultaneously into the solvent in the desired proportions and amount. The mixture is heated while being stirred. The solvent in time dissolves the pulverized solids.

A specific solution of lead borate is prepared as follows: To 350 grams of ethylene glycol is added 35.5 grams of powdered boric acid and 130 grams of litharge, these proportions providing a 30% solution. The mixture is heated while being stirred.

The rapidity of solution is proportional to the temperature. A temperature of 120° C. is sufficient to effect solution of the powdered solids, but the time required is rather long. At 140°–150° C. solution is effected in about six hours. At about the boiling point of ethylene glycol, approximately 210° C., the solution of small quantities of lead borate in a test tube takes place in about 15 minutes. In all cases mechanical stirring and fine subdivision of the solids increases the speed of dissolution.

A 45% solution of lead borate may be effected by adding 33.2 grams of boric acid and 117.7 grams of litharge to the 30% solution with heating at 140°–150° C. and stirring for some 20 hours more. A clear solution is produced. It is a heavy mobile liquid with a specific gravity of 1.88.

Transparent solutions of a very light color are prepared by effecting the solution in an inert atmosphere. In air the prolonged heating over a period of hours results in a dark though transparent solution.

Highly concentrated solutions may be prepared from a 30% lead borate-ethylene glycol solution by distillation at reduced pressures. Solutions having 45% and 55% of lead borate are readily obtained by such a process.

An alternative procedure of putting lead borate into solution is to employ fused lead borate glass pulverized to 100 mesh or finer. The pulverized glass may be put into solution by heating it in the polyhydroxy alcohol while stirring, as with the unfused components above set forth.

Three component glasses, including lead borate, may be put into solution in several ways. One convenient method is to prepare a solution of lead borate in a polyhydric alcohol by the previously outlined procedure. The third component may then be added and put into solution, by subjecting to heating while agitating. Sodium, as caustic soda, has been added to a solution of lead borate in ethylene glycol in this manner.

In certain cases a second mode of incorporating a third component such as silica into lead borate solution is feasible. A solution of silicic acid in ethyl alcohol is mixed with a polyhydric alcohol such as diethylene glycol. The ethyl alcohol is driven off by heating. The resulting solution comprises silicic acid in diethylene glycol. Lead borate powder may thereafter be dissolved in the diethylene glycol silicic acid solution to give the desired three component solution.

Among the third components which may be put into solution with lead borate are the alkali metal oxides and hydroxides. A convenient method of incorporation of sodium oxide is to dissolve $Na_2B_4O_7$ (borax) along with lead oxide (litharge) by the heating and stirring procedure above set forth.

The oxides and hydroxides of calcium are soluble along with lead borate in the polyhydric alcohols. Calcium oxide may be directly added to a 30% lead borate solution in ethylene glycol. On the other hand calcium oxide may be dissolved first in ethylene glycol and the lead borate added thereafter.

A typical solution was prepared embodying a three component glass consisting of lead oxide, boric oxide and silicon oxide in the following proportions: 74.2% lead oxide, 18.9% boric oxide, and 6.9% silicon dioxide. A mixture of ethylene glycol and diethylene glycol contained 23.3% of this lead-boro-silicate glass in solution. Another lead boro-silicate glass having 7.5% $SiO_2$ was dissolved in diethylene glycol to give a 10% solution.

The solution is susceptible to numerous industrial applications. In solution, lead borate glasses may be applied to numerous materials, the solvent removed and a residue of the lead borate, with or without additional ingredients, be deposited. In this manner, lead borate may be employed in many electrical installations where otherwise lead borate glass would be difficult to apply.

The solution so formed has the property of wetting certain porous materials, such as asbestos, carborundum discs, and the like. A 30% solution of lead borate in ethylene glycol will wet felted asbestos at room temperature. A 45% solution will soak into asbestos at 100° C. but a 55% solution apparently, due to its viscosity, will not penetrate asbestos felt at any temperature. When heated at temperatures of 200° C., 55% solutions tend to char slightly.

The solvent may be removed from these solutions by heating in ovens at moderate temperatures above the boiling point of the solvent. A fairly hard gelatinous film is formed. It is believed that some of the glycol is retained within this film since upon heating to 300° C. and higher, the film bubbles and chars. The film retains some dark residue, probably carbon at the lower temperatures, but after baking at 500 to 550° C., it decolorizes to a transparent glaze.

The lead borate glass, with or without additional ingredients, when deposited on metals from the solution, adheres tenaciously to the metals after baking. Copper, for example, exhibits a clean reddish surface beneath the glaze, indicating that no appreciable oxidation has occurred. This solution of glass is therefore particularly useful in applying lead borate glass as vitreous enamels to metals and the like. Numerous other coating uses are possible.

The solution of lead borate in a polyhydric alcohol has numerous possible uses as a solution in chemical and electrical manufacturing.

It is appreciated that, as a general principle, minute quantities of lead borate glasses are soluble in some solvents. However, for the purpose of this invention, substantial quantities of lead borate have not hitherto been put into solution in a range from less than 1% to solutions having as high as 55% solute, particularly in polyhydroxy alcohols.

It is, of course, to be understood that this invention is described with reference to specific embodiments thereof, and that other and various modifications may be made without in any way departing from the spirit of the invention as set forth in the appended claims.

I claim as my invention:

1. A solution comprising a lead borate glass in a liquid polyhydric alcohol.

2. A solution comprising a liquid polyhydroxy alcohol solvent and a solute composed of lead oxide and boric oxide.

3. A solution of a glass comprising a liquid polyhydroxy alcohol solvent and a solute composed of lead borate glass, the lead borate glass being dissolved in the polyhydroxy alcohol by stirring and heating pulverized lead borate glass.

4. A solution of a glass comprising ethylene glycol, lead oxide and boric oxide, the whole being subjected to heating and stirring whereby the lead oxide and boric oxide go into solution.

5. A solution of the constituents of a glass comprising a liquid polyhydroxy alcohol solvent and a solute composed of lead oxide, boric oxide and at least one glass forming oxide or hydroxide of the group of elements consisting of calcium, silicon and the alkali metals.

6. A solution of glass forming components comprising a liquid polyhydroxy alcohol solvent and a frit dissolved therein by heating the solvent to a predetermined temperature, the frit being composed of the pulverized fused oxides of lead and boron, and at least one glass forming oxide of the group elements consisting of calcium, silicon and the alkali metals.

7. A solution of glass forming components composed of a liquid polyhydroxy alcohol solvent and the solute comprising lead oxide, boric oxide and silicon dioxide.

8. A solution of glass forming components composed of a liquid polyhydroxy alcohol solvent and the solute comprising lead oxide, boric oxide and calcium oxide.

9. A solution of glass forming components comprising a liquid polyhydroxy alcohol solvent and a solute of lead oxide, boric oxide and at least one oxide of an alkali metal.

ROBERT N. WENZEL.